United States Patent
White et al.

(10) Patent No.: US 8,312,188 B1
(45) Date of Patent: Nov. 13, 2012

(54) SYSTEMS AND METHODS FOR DYNAMIC BUFFER ALLOCATION

(75) Inventors: Martin White, Sunnyvale, CA (US); Carmi Arad, Nofit (IL)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 12/961,537

(22) Filed: Dec. 7, 2010

Related U.S. Application Data

(60) Provisional application No. 61/290,108, filed on Dec. 24, 2009.

(51) Int. Cl.
  *G06F 3/00* (2006.01)
  *G06F 5/00* (2006.01)
  *G06F 15/16* (2006.01)

(52) U.S. Cl. .............. 710/56; 710/29; 710/57; 710/60; 709/235

(58) Field of Classification Search .......... 370/229, 370/231, 235; 709/230, 232, 234, 235; 710/1, 710/29, 52, 56, 57, 58, 60; 711/100, 147, 711/153
See application file for complete search history.

(56) References Cited

U.S. PATENT DOCUMENTS

| | | | | |
|---|---|---|---|---|
| 6,046,817 A | * | 4/2000 | Brown et al. | 358/1.16 |
| 6,252,849 B1 | * | 6/2001 | Rom et al. | 370/230 |
| 7,000,025 B1 | * | 2/2006 | Wilson | 709/235 |
| 2008/0222352 A1 | * | 9/2008 | Booth et al. | 711/108 |
| 2008/0301336 A1 | * | 12/2008 | Bilak et al. | 710/56 |

OTHER PUBLICATIONS

IEEE P802.1Qbb/D2.3; Draft Standard for Local and Metropolitan Area Networks—Virtual Bridged Local Area Networks—Amendment: Priority-based Flow Control; May 25, 2010; pp. 1-28; Institute of Electrical and Electronics Engineers, Inc.; New York, NY.

* cited by examiner

*Primary Examiner* — Chun-Kuan Lee
*Assistant Examiner* — Ronald Modo

(57) ABSTRACT

A first network device includes a first port to provide first data traffic to a first storage area network, a second port to provide second data traffic to a local area network, and memory shared between the first port and the second port to temporarily store the first data traffic in N first buffers and the second data traffic in M second buffers. A queue control module allocates a first memory space of the N first buffers to the first port and a second memory space of the M second buffers to the second port. An adjustment module adjusts a first amount of the first memory space and a second amount of the second memory space in response to a congestion event is caused by a first data traffic. Up to all of the first memory space and the second memory space is allocated to the N first buffers.

18 Claims, 6 Drawing Sheets

SYSTEMS AND METHODS FOR DYNAMIC BUFFER ALLOCATION

CROSS-REFERENCE TO RELATED APPLICATIONS

This application claims the benefit of U.S. Provisional Application No. 61/290,108, filed on Dec. 24, 2009. The disclosure of the above application is incorporated herein by reference in its entirety.

FIELD

The present disclosure relates generally to data networks and more particularly to allocating buffers for incoming network data within a network device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

FIG. 1 illustrates a conventional network 100. In the network 100, a network switch 102 connects two devices 104-1 and 104-2 (hereinafter devices 104). Each of devices 104 can be any network device, such as a computer, a printer, another network switch, or the like. The switch 102 transfers data between devices 104 over channels 106-1 and 106-2 (hereinafter channels 106), and can also handle an arbitrary number of devices in addition to the devices 104. The channels 106 can include fiber optic links, wireline links, wireless links, and the like.

SUMMARY

A first network device includes a first port to provide first data traffic to a first storage area network (SAN), a second port to provide second data traffic to a local area network (LAN), and memory shared between the first port and the second port to temporarily store the first data traffic in N first buffers and the second data traffic in M second buffers in the memory. A queue control module is configured to allocate a first memory space of the N first buffers to the first port and a second memory space of the M second buffers to the second port. An adjustment module is configured to, in response to a congestion event, adjust a first amount of the first memory space and a second amount of the second memory space. The congestion event is caused by the first data traffic within the first network device when the first memory space allocated to the first port is full or by the second data traffic within the first network device when the second memory space allocated to the second port is full. M and N are integers greater than or equal to 1.

A method for operating a network device includes providing first data traffic to a first storage area network (SAN) via a first port of the network device, providing second data traffic to a local area network (LAN) via a second port of the network device and sharing memory of the network device between the first port and the second port by temporarily storing the first data traffic in N first buffers in the memory and the second data traffic in M second buffers in the memory. The method further includes allocating a first memory space of the N first buffers to the first port and a second memory space of the M second buffers to the second port and adjusting, in response to a congestion event, a first amount of the first memory space and a second amount of the second memory space. The congestion event is caused by the first data traffic within the network device when the first memory space allocated to the first port is full or by the second data traffic within the network device when the second memory space allocated to the second port is full. M and N are integers greater than or equal to 1.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
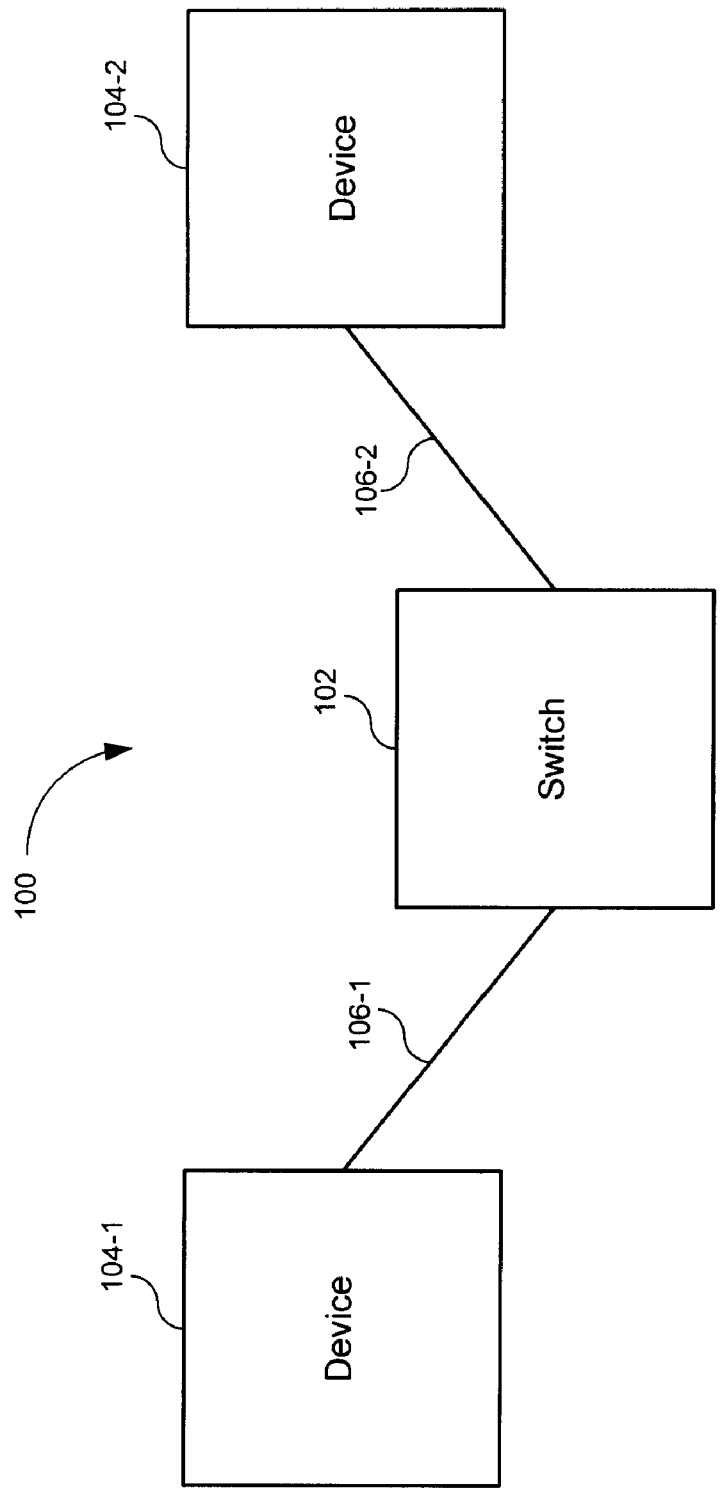
FIG. 1 is a network in which a network switch connects two devices according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 2:
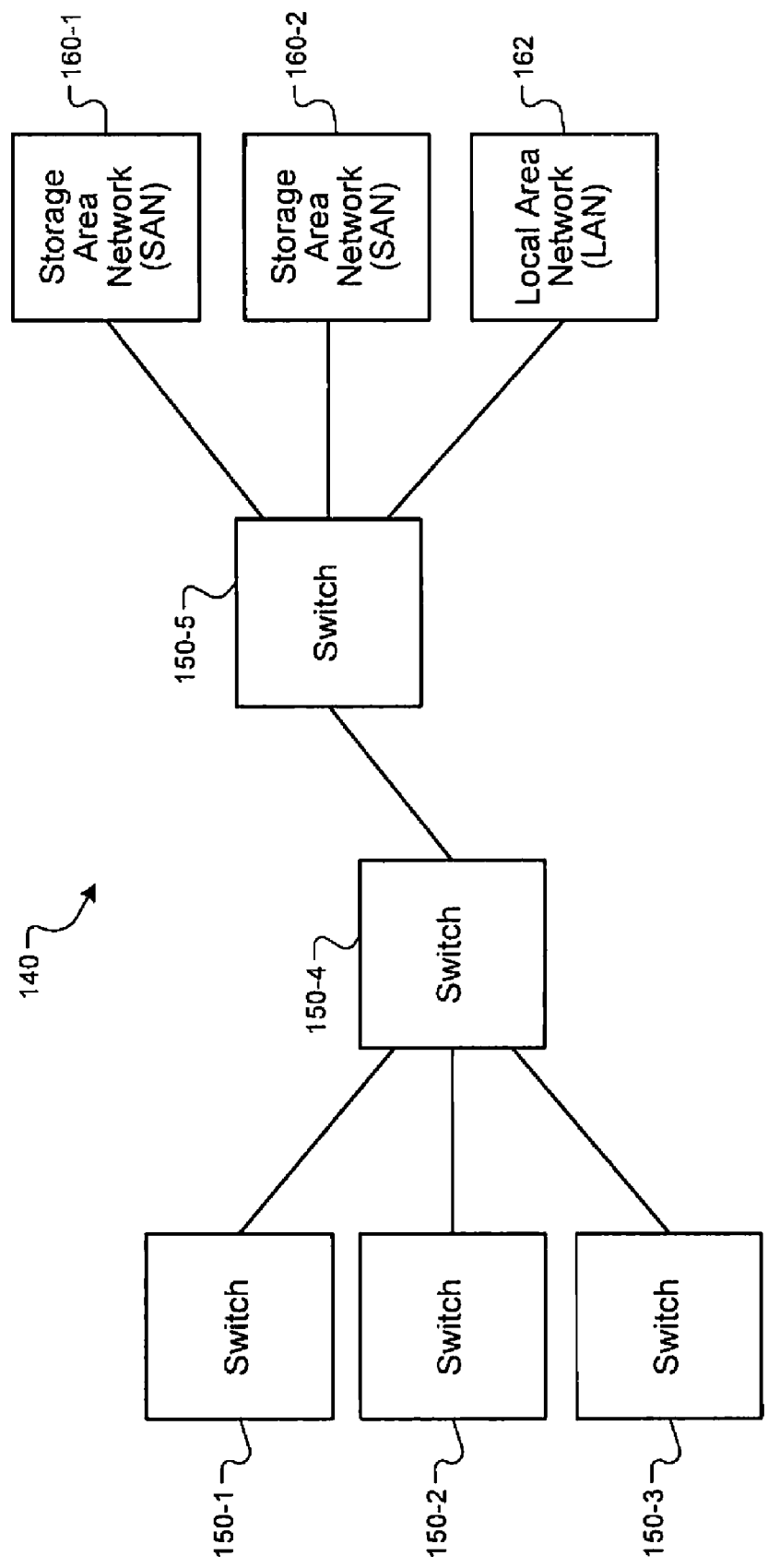
FIG. 2 is a block diagram of a network according to the present disclosure.

FIG. 2 illustrates a network 140. In one example of the disclosure, the network 140 complies with Fiber Channel over Ethernet (FCoE) protocols and is a 10 Gigabit Ethernet (10 GbE) network. A plurality of network devices, such as switches, are connected in the network 140. Each of the plurality of switches can communicate with one or more endpoints, such as storage area networks (SANs) and local area networks (LANs). In an alternative example of the disclosure, each of the network devices can be any network device, such as a computer, a printer or the like.

Five switches 150-1, 150-2, 150-3, 150-4, 150-5 (hereinafter referred to as switches 150) are shown, but one or more other switches may be connected to or between any or all of the five switches 150. The switch 150-5 directly communicates with two SANs 160-1, 160-2 (hereinafter SANs 160) and a LAN 162. However, the switch 150-5 can communicate with one or more SANs and LANs or other networks or network devices, and the specific example of the disclosure is merely provided for purposes of illustration. Further, any of the switches 150-1, 150-2, 150-3, 150-4, can also communicate with one or more SANs and LANs. The switches 150 transfer data over channels. The channels can include fiber optic links, wireline links, wireless links, and the like.

An advantage of 10 GbE is that separate networks for SANs and LANs can be combined in a single 10 GbE network. While 10 Gb links may have sufficient bandwidth to carry both types of data, bursts of traffic can cause congestion events, which can result in traffic delay in the switch 150-5.

SAN traffic is sensitive to delay and is thus referred to herein as lossless traffic, whereas LAN traffic is less sensitive and is thus referred to herein as lossy traffic. Delay in traffic can cause data to be dropped. The present disclosure attempts to reduce or eliminate delay or congestion events in the network 140, particularly for SAN traffic.

IEEE 802.1Qbb Priority-based Flow Control (PFC), incorporated herein by reference, provides a method to stop the flow of low-priority packets while permitting high-priority data to flow. When multiple SANs 160 are connected to the switch 150-5, the switch or any one of the SANs 160 can issue a PFC signal that can stall traffic causing the congestion event. The PFC signal travels from switch to switch back to the source of the traffic. However, the other SAN(s) 160 will then experience potential lost data flow and/or delay in receiving traffic due to the PFC signal. The present disclosure selectively provides increased buffer space for SAN traffic to reduce effects of congestion events and therefore to reduce or eliminate need for assertion of PFCs.

To illustrate, SAN 160-1 receives data from switch 150-1 via switches 150-4 and 150-5, and SAN 160-2 receives data from switch 150-2 via switches 150-4 and 150-5. A burst of data for SAN 160-1 creates a congestion in the switch 150-5 and causes the switch 150-5 and/or the SAN 160-1 to issue a PFC. The PFC stops data transfer from switch 150-5 to switch 150-4 and from switch 150-4 to switch 150-1.

However, the switch 150-2 may have data that it is attempting to exchange with SAN 160-2. The data may be inhibited from flowing due to the PFC signal received by switches 150-4 and 150-5. In this example, the switch 150-5 selectively provides increased buffer space for SAN traffic to reduce effects of SAN related congestion. Otherwise, the SAN traffic would continue to be processed, but little or no additional SAN traffic would enter the switch 150-5 until the PFC signal is no longer asserted.

Figure 3:
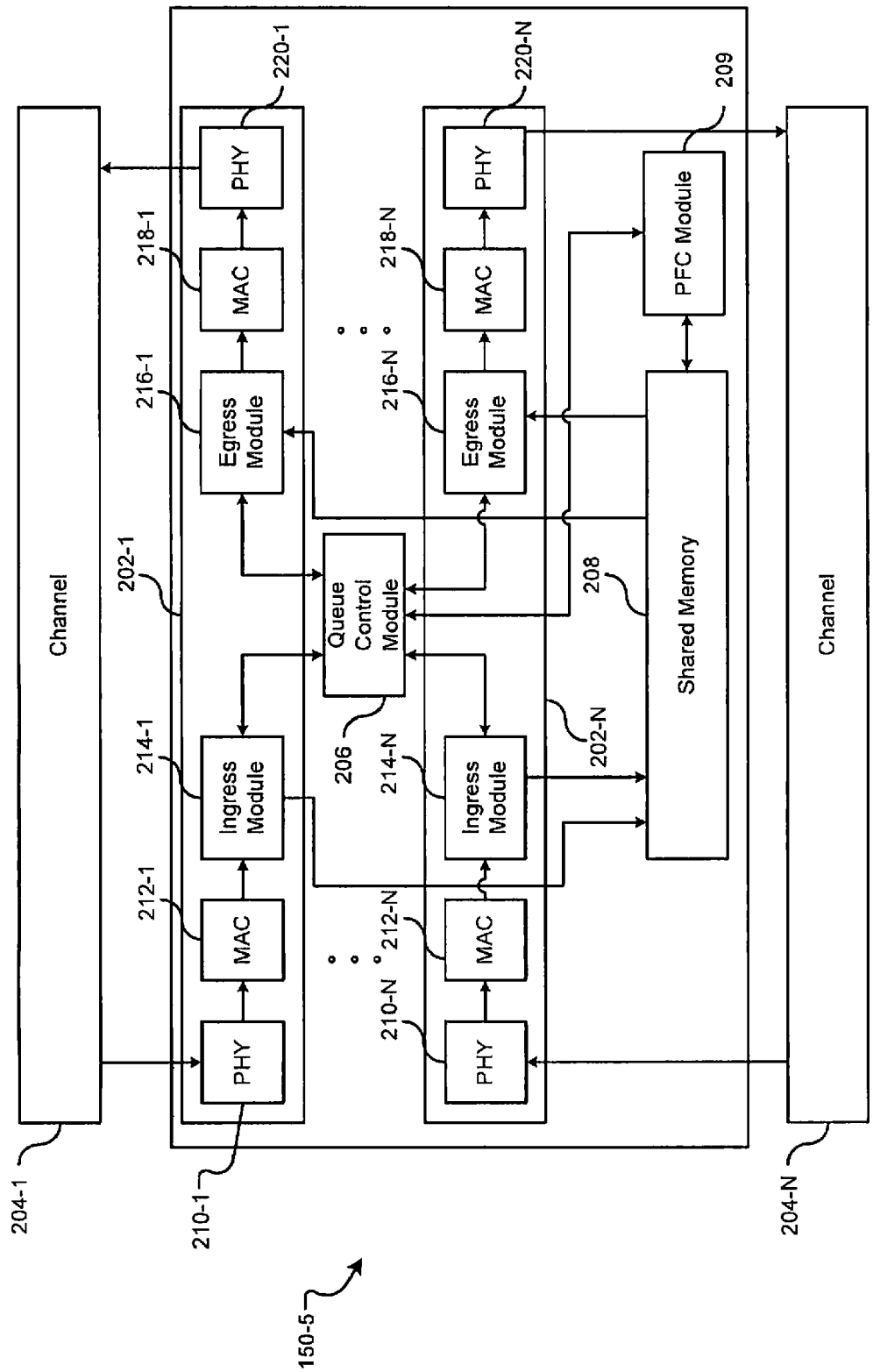
FIG. 3 is a block diagram of a network switch according to the present disclosure.

Referring now to FIG. 3, a block diagram of the switch 150-5 is illustrated. The switch 150-5 has a plurality of ports including ports 202-1 to 202-N (hereinafter referred to as ports 202). Each port 202 is connected to a channel 204-1 to 204-N (hereinafter referred to as channels 204), a queue control module 206 and shared memory 208. The queue control module 206 and the shared memory 208 communicate with a PFC module 209.

The PFC module 209 controls the amount of the shared memory 208 that is allocated to lossy traffic for the LAN 162 and lossless traffic for the SANs 160-1, 160-2. The PFC module 209 increases the amount of the shared memory 208 allocated for lossless traffic in response to a congestion event for the lossless traffic. A PFC signal may be required when signals from the queue control module 206 indicate the congestion event for lossless traffic that is not resolved by allocating more memory space to lossless traffic. The PFC module 209 will be discussed in further detail later in the present disclosure.

Each port 202 includes an ingress module 214-1 to 214-N (hereinafter ingress modules 214) that is connected to a channel 204 by a physical layer (PHY) device 210-1 to 210-N (hereinafter PHY 210) and a media access controller (MAC) 212-1 to 212-N (hereinafter MAC 212), respectively. For example, the port 202-1 includes an ingress module 214-1 that is connected to the channel 204-1 by a MAC 212-1 and a PHY 210-1. The port 202-N includes an ingress module 214-N that is connected to the channel 204-N by the MAC 212-N and the PHY 210-N.

Each port 202 also includes an egress module 216-1 to 216-N (hereinafter egress module 216) that is connected to a channel 204 by a MAC 218-1 to 218-N (hereinafter MAC 218) and a PHY 220-1 to 220-2 (hereinafter PHY 220), respectively. For example, the port 202-1 includes the egress module 216-1 connected to the channel 204-1 by the MAC 218-1 and the PHY 220-1. The port 202-N includes an egress module 216-N that is connected to the channel 204-N by the MAC 218-N and the PHY 220-N.

At power-on, the queue control module 206 initializes a list of pointers to unused buffers in the shared memory 208. A port 202 of the switch 150-5 receives a frame from a channel 204. The frame enters the port 202 connected to the channel 204 and traverses the PHY 210 and MAC 212 of the port 202 to reach the ingress module 214 of the port 202. The ingress module 214 requests and receives one or more pointers from queue control module 206. The ingress module 214 stores the frame at the buffers in the shared memory 208 that are indicated by the received pointers.

The ingress module 214 then determines to which channel (or channels in the case of a multicast operation) the frame should be sent. The queue control module 206 sends the selected pointers to the egress modules 216 of the ports connected to the selected channels. The egress modules 216 then retrieve the frame from the buffers indicated by the pointers and send the frame to their respective channels 204. The egress modules 216 then release the pointers for use by another incoming frame.

The queue control module 206 performs switching by operating only on the pointers to the shared memory 208. The queue control module 206 does not operate on the frames. If pointers to frames are sent to an egress module 216 faster than that egress module 216 can transmit the frames over its channel 204, the pointers are queued within that port's output queue.

Figure 4:
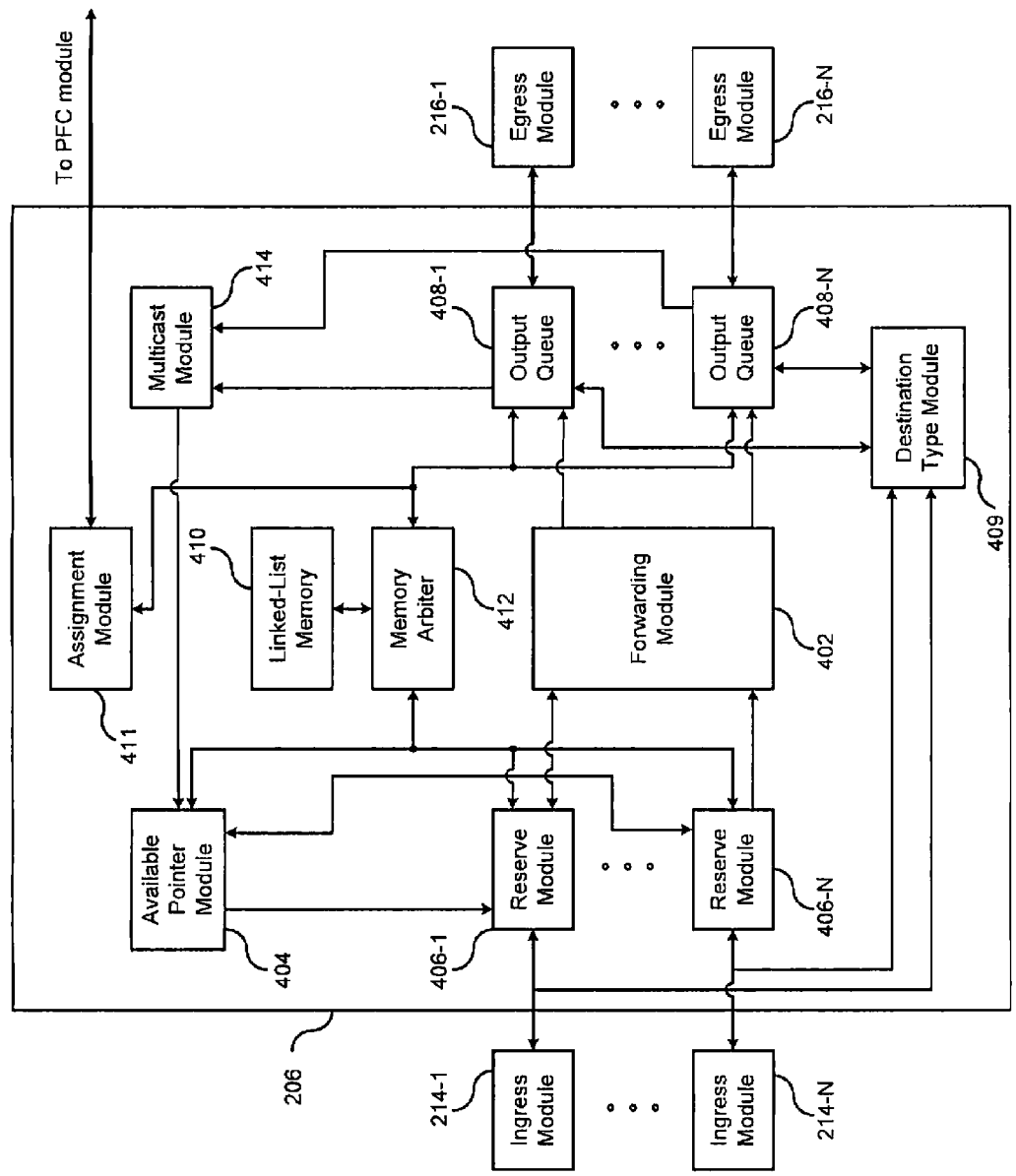
FIG. 4 is a block diagram of a queue control module according to the present disclosure.

Referring now to FIG. 4, a block diagram of the queue control module 206 is illustrated. The queue control module 206 can be implemented using hardware, software, or any combination thereof. The queue control module 206 includes a forwarding module 402, an available pointer module 404, a plurality of reserve modules 406-1 to 406-N (hereinafter reserve modules 406), a plurality of output queues 408-1 to 408-N (hereinafter output queues), a destination type module 409 and an assignment module 411. Each reserve module 406 is connected to one of the ingress modules 214, respectively. Each output queue 408 is connected to one of the egress modules 216, respectively.

The destination type module 409 determines whether the frame is destined for a SAN 160 or a LAN 162. In one example, the destination type module 409 sends a signal to connected devices. The devices respond to indicate whether they receive SAN traffic or LAN traffic and/or if they are part of a SAN 160 or LAN 162. Alternatively, the destination type module 409 analyzes traffic flows (e.g., by checking packet headers) and determines the type of the traffic flows and whether they are SAN or LAN traffic.

The available pointer module 404 and the reserve modules 406 each contain one linked list of pointers to buffers in the shared memory 208. Each output queue 408 contains a priority queue for each class of service implemented by the switch 150-5. Each priority queue contains one linked list of pointers to buffers in the shared memory 208.

In one example of the disclosure, the assignment module 411 limits use of available buffers based on signals from the PFC module 209. Therefore, if the output queue 408 or one or more of its priority queues communicates with a SAN 160, the assignment module 411 allows the queue control module 206 to assign pointers to the output queue 408 for a lossless traffic pool. If the output queue 408 or one or more of its priority queues communicates with a LAN 162, the assignment module 411 allows the queue control module 206 to assign pointers to the output queue 408 for a lossy traffic pool. Lossy and lossless traffic pools therefore each correspond to one or more buffers (not shown). Lossy and lossless traffic pools will be discussed with regard to FIGS. 6A-6C.

All of the linked lists for the available pointer module 404, the reserve modules 406, and the output queues 408 are stored in a linked-list memory 410. A memory arbiter 412 arbitrates among competing requests to read and write the linked-list memory 410. Each of the available pointer module 404, the reserve modules 406, and the output queues 408 maintains an object that describes its linked list. Each of these objects maintains the size of the list and pointers to the head and tail of the list. Each of the available pointer module 404, reserve modules 406, and output queues 408 traverses its linked list by reading and writing the "next" links into and out of the linked list memory 410.

The available pointer module 404 contains pointers to buffers in the shared memory 208 that are available to store newly-received frames (that is, the buffers have an available status). Each reserve module 406 contains a list of pointers to available buffers that are reserved for the port housing that reserve module.

The multicast module 414 handles multicast operations. In the linked-list memory 410, pointers associated with the start of a frame also have a destination vector including a bit for each destined output port for the frame. When an output port finishes transmitting a frame, the output queue passes the frame's pointers to the multicast module 414. The multicast module 414 clears the bit in the destination vector associated with that output port. When all of the bits in the destination vector have been cleared, the frame's pointers are returned to the available pointer module 404.

Figure 5:
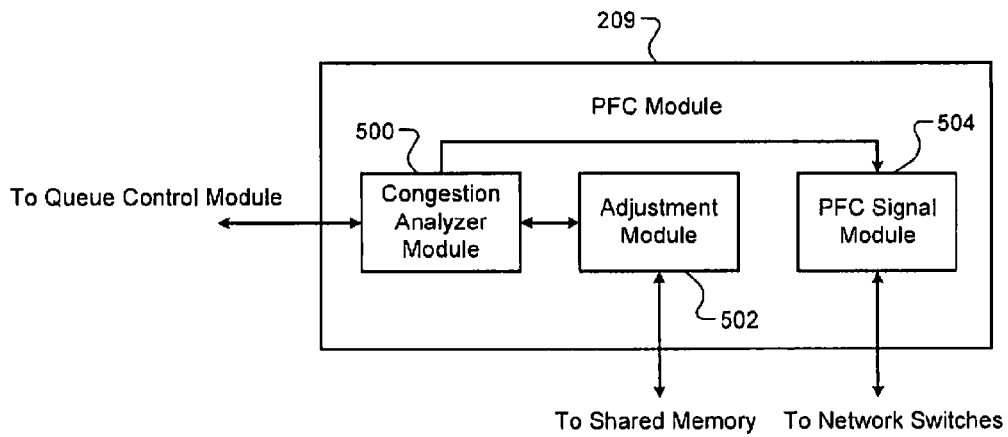
FIG. 5 is a block diagram of a priority flow control module according to the present disclosure.

FIG. 5 illustrates the PFC module 209 in more detail. In one example of the disclosure, the PFC module 209 includes a congestion analyzer module 500, an adjustment module 502 and a PFC signal module 504. In one example of the disclosure, ports 202 receive traffic that is intended for a LAN 162 or a SAN 160. The queue control module 206 initializes a list of pointers to buffers in the shared memory 208 and assigns the pointers to ports 202 connected to the LAN 162 or the SAN 160.

Figure 6A:
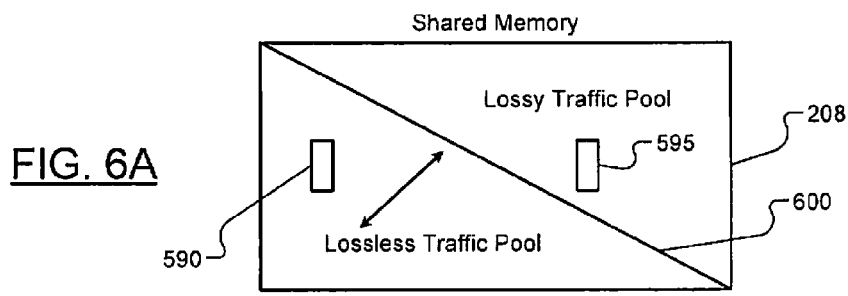
FIGS. 6A-6C illustrate shared memory according to the present disclosure.
Figure 6B:
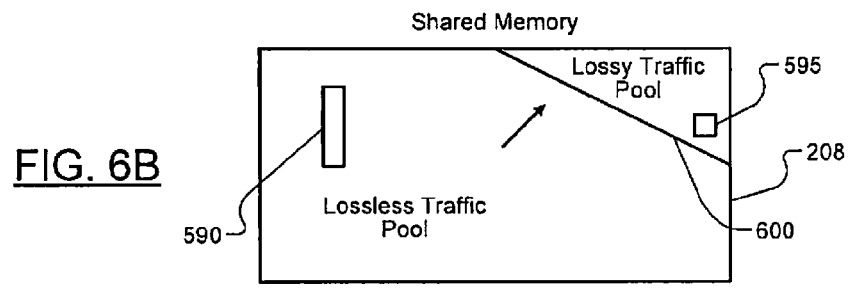
Figure 6C:
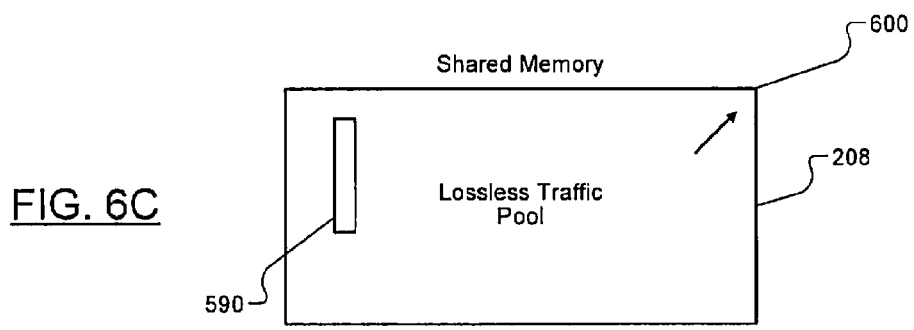

Referring now to FIGS. 6A-6C, in one example, the queue control module 206 initializes the same number of pointers to buffers for each port 202 and thus for each of the LAN 162 and SANs 160. Alternatively, the queue control module 206 allocates buffers according to a predetermined scheme. For example, the queue control module 206 allocates more pointers to either SAN connected ports or LAN connected ports.

LAN traffic may be lossy, whereas SAN traffic may be lossless. FIG. 6A illustrates a lossy traffic pool in the shared memory that corresponds to buffer space allocated to LANs 162. FIG. 6A also illustrates a lossless traffic pool that corresponds to buffer space allocated to SANs 160. Although only one lossy traffic pool and one lossless traffic pool are illustrated, one or more other lossy and lossless traffic pools may be provided.

In one example, each buffer may have its own traffic pool that may be designated a lossy traffic pool or a lossless traffic pool depending on whether the buffer stores data intended for a SAN 160 or a LAN 162. In one example, the lossy traffic pool is separated from the lossless traffic pool by a guard band 600. The guard band 600 represents drop limits for buffer(s) within the respective lossy or lossless traffic pools (e.g., buffer 590 in the lossless traffic pool and buffer 595 in the lossless traffic pool). Drop limits indicate the capacity of a buffer or buffers. That is, when a drop limit is met, the buffer can not store additional data, and the data may be dropped rather than transmitted through the switch 150-5.

In one implementation, if the queue control module 206 attempts to assign pointers to the buffer(s), and the buffers are already at the guard band limit for the buffer(s), the queue control module 206 may not assign the pointers. However, the PFC module 209 can adjust the position of the guard band 600 to increase (or decrease) limits on space in the buffer(s) and/or provide more buffers in the respective pools that can receive data for respective SANs 160 or LANS 162.

The adjustment of the guard band 600 may be implemented in a priority order. In one implementation, buffers that are used by lower priority queues for LAN traffic are reallocated to SAN traffic before buffers for higher priority queues.

The adjustment module 502 configures the guard band 600 to guarantee memory space to lossless traffic by limiting memory space to lossy traffic. The maximum memory space for the lossless traffic pool is preset by the adjustment module 502 up to the entire available memory space in the shared memory 208. In contrast, the maximum memory space for the lossy traffic pool is set by the adjustment module 502 to the original size of the lossy traffic pool.

The queue control module 206 can set all queues for SAN traffic to use the lossless traffic pool(s) by assigning pointers to buffers in the lossless traffic pool(s) for the SAN traffic. The queue control module 206 can set all queues for LAN traffic to use the lossy traffic pool(s) by assigning pointers to buffers in the lossy traffic pool(s) for the LAN traffic.

The queue control module 206 detects congestion events for incoming and outgoing traffic. For example, a congestion event occurs when one of the buffers is full and data is still coming in for the respective port for that buffer. The queue control module 206 may send a signal indicating the congestion event to the congestion analyzer module 500. The congestion analyzer module 500 determines whether the congestion event affects traffic that is intended for a LAN 162 or a SAN 160. For example, the queue control module 206 provides signals as to the type of device or network connected to each port. The congestion analyzer module 500 analyzes the signals and determines whether an adjustment needs to be made in the size of the lossy and lossless traffic pools.

The adjustment module 502 adjusts the size of the traffic pools in response to signals from the congestion analyzer module 500. For example, in FIG. 6B, when a buffer for a SAN 160-1 is full, the adjustment module 502 increases the size of the lossless traffic pool by adjusting the location of the guard band 600. The adjustment module 502 may increase the size of the lossless traffic pool up to the size of the shared memory 208, as seen in FIG. 6C. In one example of the present disclosure, the traffic pools have a corresponding amount of buffer space that is usable by any of the respective SANs 160 or LANs 162. For example, all the SANs 160 share the lossless traffic pool memory space, and all the LANs 162 share the lossy traffic pool memory space.

Alternatively, each SAN 160 or LAN 162 has a respective buffer assigned to it by the queue control module 206 via pointers. The sizes of the buffers for any or all of the SANs or LANs are increased or decreased based on the size of the respective traffic pool. For example, when the lossy traffic pool size is increased, each buffer for each LAN 162 is increased in size by the same amount. Also, when the lossless traffic pool is increased, each buffer for each SAN 160 is increased by the same amount.

Alternatively, only the buffer(s) for SANs 160 or LANs 162 that are experiencing a congestion event are increased (or decreased) by the amount of memory the respective traffic pool is increased (or decreased). For example, when the lossy traffic pool is increased, only the size of the buffer for one of the LANs 162 is increased by the amount of memory the lossy traffic pool is increased. Also, when the lossless traffic pool is increased, only the size of the buffer for the SAN 160 experiencing the congestion event is increased by the amount of memory the lossless traffic pool is increased.

In another example of the present disclosure, the lossy traffic pool is not increased or decreased based on traffic to LANs 162. Instead, increase or decreased of both lossy and lossless traffic pools is based entirely on congestion for a SAN 160 communicating with the switch 150-5.

In one example, a single buffer 590 is illustrated in the lossless traffic pool, and a single buffer 595 is illustrated in the lossy traffic pool. In alternative examples one or more buffers populate both traffic pools.

In FIGS. 6A-6C, for example, the buffer 590 and the buffer 595 are the same size when the guard band 600 is in a first position. The guard band 600 may be in the first position when there are no congestion events. When there is a congestion event for lossless traffic, the buffer 590 is increased in size (i.e., memory capacity is increased), whereas the buffer 595 is decreased in size (i.e., memory capacity or amount is decreased). This may be seen in FIG. 6B where the guard band 600 is moved to a second position. Further, the buffer 590 may be further increased in size up to the size of the buffer 590 plus the size of the buffer 595 to resolve the congestion event. This may be seen in FIG. 6C. In one implementation, the buffer 590 may be increased up to the total capacity of the shared memory 208 when there are only the two buffers 590, 595. However, as pointed out, one or more buffers may be used and increased or decreased in size (i.e., the amount of memory for the buffers is adjusted) according to the present disclosure.

There may be a congestion event for a SAN 160 after the adjustment module has adjusted the shared memory so that all of the available buffer space is allocated to the lossless traffic pool. In this event, the PFC signal module 504 issues a PFC signal that travels through the network 140 until it reaches the origin of the traffic. For example, the PFC signal travels from switch 150-5 to switch 150-4 and from switch 150-4 to switch 150-1. The adjustment module 502 may reallocate buffer space to the lossy traffic pool after the congestion event is resolved.

Figure 7:
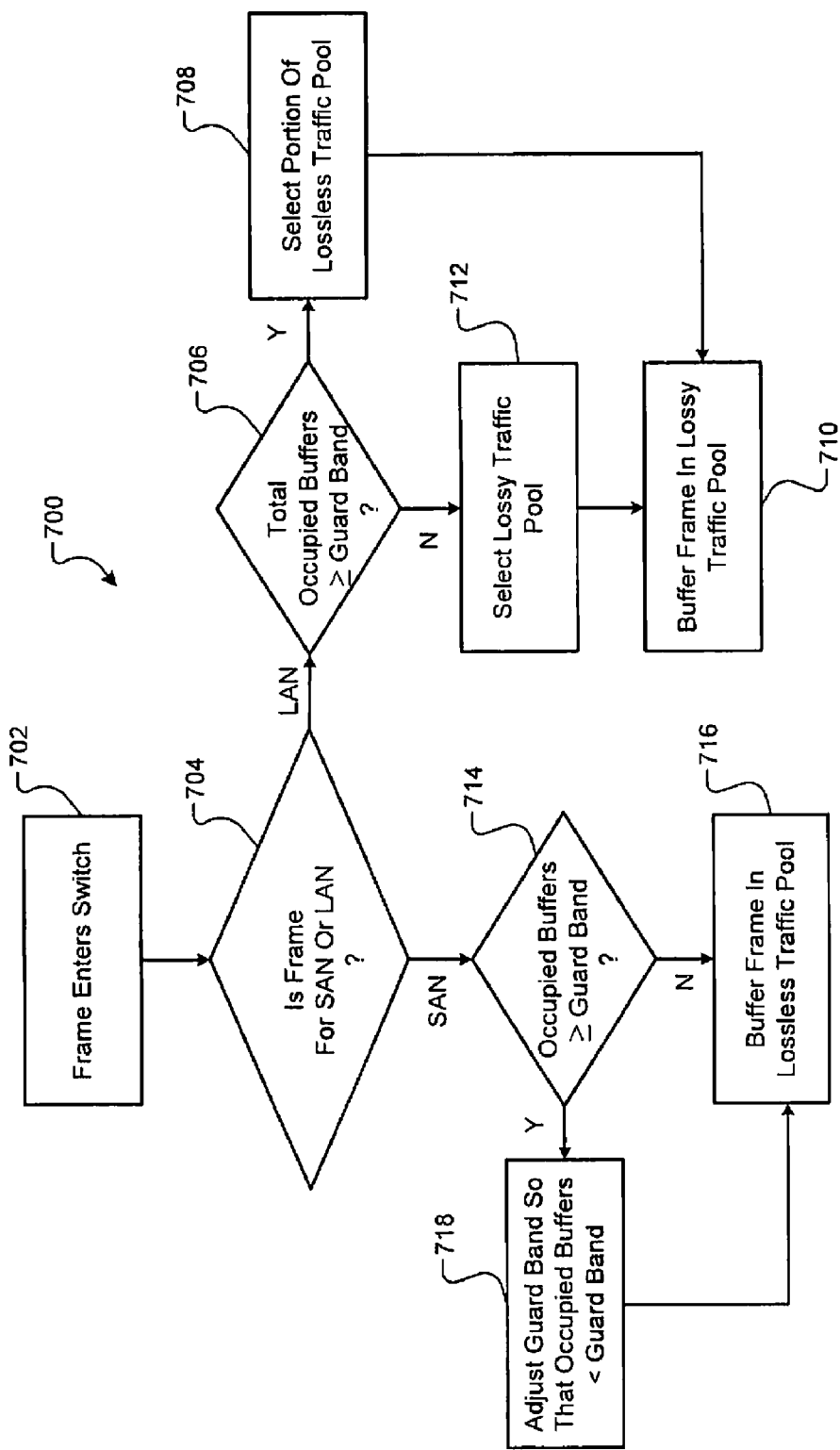
FIG. 7 is a logic flow diagram that illustrates a method for operating a switch according to the present disclosure.

Referring now to FIG. 7, an example 700 of a method for operating a network switch 150-5 is illustrated. In 702 a data frame enters the switch 150-5. In 704 the queue control module 206 determines the destination device or network for the frame. In one example of the disclosure, the queue control module 206 determines whether the frame is destined for a SAN 160 or a LAN 162.

In 706 if the frame is destined for a LAN 162, the adjustment module 502 determines whether an adjustment to the guard band 600 should be made. Adjusting the guard band 600 adjusts the lossy traffic pool(s) drop threshold(s). Lossy traffic is dropped when the drop threshold is met for the lossy traffic pool(s). The drop threshold is met when the lossy traffic pool and/or a buffer within the lossy traffic pool cannot hold incoming data, and thus the data may be dropped or delayed.

The total amount of occupied buffers in the shared memory 208 may be greater than the guard band based memory allocation for the lossy memory pool. If so, then in 708, if there is no lossless traffic congestion, the guard band 600 may be adjusted. For example, a non-empty or empty portion of a lossless traffic pool may be reclaimed for the lossy traffic pool by adjusting the guard band 600.

In one example, the lowest priority portion of the lossless traffic pool may be reclaimed for the lossy traffic pool. That is, the guard band 600 is adjusted so that the lowest priority portion (or alternatively the lowest priority lossless traffic pool) is within the lossy traffic pool. The lowest priority portion corresponds to buffer space for the lowest priority queues processing SAN traffic. In 710 the queue control module 206 buffers the frame in the lossy traffic pool.

In 712 the total amount of occupied buffers in the shared memory 208 may be less than the guard band based allocation for the lossy traffic pool. In this case, a lossy traffic pool (in the event of multiple lossy traffic pools) or a portion of a lossy traffic pool is selected by the queue control module 206. For example, the queue control module 206 selects the portion of the lossy traffic pool that has the highest priority and that has available space. In 710 the queue control module 206 buffers the frame in the lossy traffic pool.

In 714 if the destination for the incoming frame is a SAN 160, then the queue control module 206 attempts to buffer the frame in the lossless traffic pool. For example, in 714 the queue control module 206 determines whether the occupied buffers in the lossless traffic pool are less than equal to the guard band 600 based on allocation for the lossless traffic pool. If they are not less than equal to the guard band 600, then space is available. The queue control module 206 then buffers the frame in the lossless traffic pool in 716. If they are equal to or greater than the guard band based allocation, then space is not available in the lossless traffic pool. In this case, in 718 the adjustment module 502 moves the guard band 600 so that more of the lossy traffic pool is now allocated to the lossless traffic pool.

If all the lossy traffic pool memory space is already allocated to the lossless traffic pool, then the PFC signal module 504 asserts a PFC signal. Otherwise, in 716 the queue control module 206 buffers the frame in the lossless traffic pool.

A port can be associated with both a LAN and a SAN and can handle both lossy traffic and lossless traffic. In other words, a port can be both a lossy port and a lossless port. A differentiation of the traffic types can be made on a priority basis. That is, whether the type of traffic through the port is lossy traffic or lossless traffic can be determined based on priority.

In some implementations, to meet performance requirements as a result of different incoming packet rates from lossless ports, and recovering memory from lossy ports, packets can be removed from the lossy traffic pools based on demand from the lossless traffic. As explained above, buffers are reclaimed from the lossy traffic pool when the lossy port has transmitted a packet and are returned to be re-allocated to either the lossless traffic pool or the lossy traffic pool. Additionally or alternatively, packets can be aggressively removed from the lossy traffic pool to absorb greater disparity between demand from lossless traffic and the ability of the lossy traffic pool to support the demand. Specifically, packets that have not yet been transmitted can be removed from the lossy traffic pools to free up buffers for the lossless traffic when demand from the lossless traffic is extremely high.

For example, the congestion analyzer module 500 can detect when demand from the lossless traffic is greater than or equal to a predetermined threshold based on signals received from the queue control module 206 and adjustments made to the size of traffic pools by the adjustment module 502. When the demand from the lossless traffic is greater than or equal to the predetermined threshold, the congestion analyzer module 500 outputs a packet removal signal to the adjustment module 502. Based on the packet removal signal, the adjustment module 502 removes packets that have not yet been transmitted from buffers in the lossy traffic pools to free up the buffers for the lossless traffic. The adjustment module 502 may free up the buffers in addition to performing adjustments and other functions described above.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first network device, comprising:
   a first port configured to provide first data traffic to a first storage area network (SAN);
   a second port configured to provide second data traffic to a local area network (LAN);
   memory shared between the first port and the second port, the memory configured to temporarily store (i) the first data traffic in N first buffers in the memory and (ii) the second data traffic in M second buffers in the memory, wherein M and N are integers greater than or equal to 1;
   a queue control module configured to allocate (i) a first memory space of the N first buffers to the first port and (ii) a second memory space of the M second buffers to the second port; and
   an adjustment module configured to, in response to a congestion event, adjust (i) a first amount of the first memory space and (ii) a second amount of the second memory space,
   wherein the congestion event is caused (i) by the first data traffic within the first network device when the first memory space allocated to the first port is full or (ii) by the second data traffic within the first network device when the second memory space allocated to the second port is full, and
   wherein the adjustment module is configured to adjust (i) the first amount of the first memory space and (ii) the second amount of the second memory space in response to the congestion event caused by the first data traffic, and
   wherein up to all of the first memory space and the second memory space is allocated to the N first buffers.

2. The first network device of claim 1, wherein adjusting the first amount of the first memory space includes allocating memory from the second memory space to the first memory space.

3. The first network device of claim 1, wherein the adjustment module is configured to adjust the first amount of the first memory space and the second amount of the second memory space in response to the congestion event caused by the second data traffic only when memory is available in the first memory space.

4. The first network device of claim 1, wherein the adjustment module is configured to increase the first memory space and decrease the second memory space in response to the congestion event, and wherein a sum of the first memory space and the second memory space remains unchanged.

5. The first network device of claim 1, further comprising a third port configured to provide third data traffic to a second SAN, wherein the queue control module is configured to allocate a third memory space of the N first buffers to the third port.

6. The first network device of claim 5, wherein the adjustment module is configured to (i) increase the first memory space or the third memory space and (ii) decrease the second memory space in response to the congestion event caused by at least one of (i) the first data traffic and (ii) the third data traffic, so that up to all of the second memory space is allocated to the N first buffers.

7. The first network device of claim 6,
   wherein (i) the first memory space and the third memory space correspond to a first pool of the memory and (ii) the second memory space corresponds to a second pool of the memory, and
   wherein the queue control module (i) buffers the first data traffic or the third data traffic in up to all of the first pool of the memory and (ii) buffers the second data traffic in the second pool of the memory.

8. A network, comprising:
   the first network device of claim 1; and
   a second network device configured to provide the first data traffic and the second data traffic to the first network device.

9. The network of claim 8, further comprising:
   a first channel configured to connect the first port to the first SAN;
   a second channel configured to connect the second port to the LAN; and
   a third channel configured to connect the second network device to the first network device.

10. The network of claim 8, wherein the first network device and the second network device are switches.

11. The network of claim 8, wherein the first network device further comprises a priority flow control module configured to send a priority flow control signal to the second network device when adjustments made by the adjustment module to adjust the first amount of the first memory space and the second amount of the second memory space are insufficient to resolve the congestion event.

12. A method for operating a network device, the method comprising:
  providing first data traffic to a first storage area network (SAN) via a first port of the network device;
  providing second data traffic to a local area network (LAN) via a second port of the network device;
  sharing memory of the network device between the first port and the second port by temporarily storing (i) the first data traffic in N first buffers in the memory and (ii) the second data traffic in M second buffers in the memory, wherein M and N are integers greater than or equal to 1;
  allocating (i) a first memory space of the N first buffers to the first port and (ii) a second memory space of the M second buffers to the second port; and
  adjusting, in response to a congestion event, (i) a first amount of the first memory space and (ii) a second amount of the second memory space,
  wherein the congestion event is caused (i) by the first data traffic within the network device when the first memory space allocated to the first port is full or (ii) by the second data traffic within the network device when the second memory space allocated to the second port is full;
  adjusting (i) the first amount of the first memory space and (ii) the second amount of the second memory space in response to the congestion event caused by the first data traffic; and
  allocating up to all of the first memory space and the second memory space to the N first buffers.

13. The method of claim 12, wherein adjusting the first amount of the first memory space includes allocating memory from the second memory space to the first memory space.

14. The method of claim 12, further comprising adjusting the first amount of the first memory space and the second amount of the second memory space in response to the congestion event caused by the second data traffic only when memory is available in the first memory space.

15. The method of claim 12, further comprising increasing the first memory space and decrease the second memory space in response to the congestion event, wherein a sum of the first memory space and the second memory space remains unchanged.

16. The method of claim 12, further comprising:
  providing third data traffic to a second SAN via a third port of the network device; and
  allocating a third memory space of the N first buffers to the third port.

17. The method of claim 16, further comprising (i) increasing the first memory space or the third memory space and (ii) decreasing the second memory space in response to the congestion event caused by at least one of (i) the first data traffic and (ii) the third data traffic, so that up to all of the second memory space is allocated to the N first buffers.

18. The method of claim 17, wherein (i) the first memory space and the third memory space correspond to a first pool of the memory and (ii) the second memory space corresponds to a second pool of the memory, the method further comprising:
  buffering the first data traffic or the third data traffic in up to all of the first pool of the memory; and
  buffering the second data traffic in the second pool of the memory.

* * * * *